United States Patent
Sann

[11] Patent Number: 5,968,574
[45] Date of Patent: Oct. 19, 1999

[54] CONVECTION FOOD STEAMER AND ASSOCIATED METHOD

[76] Inventor: Melbourne H. Sann, 8141 Old Floyd Rd., Rome, N.Y. 13440

[21] Appl. No.: 09/256,146

[22] Filed: Feb. 24, 1999

[51] Int. Cl.$^6$ ............... A23L 3/00; A47J 27/04; A47J 27/16; F24D 1/00
[52] U.S. Cl. .............. 426/510; 99/330; 99/417; 99/446; 99/448; 126/20; 126/369; 219/401; 426/511
[58] Field of Search ............... 99/330, 331, 400, 99/401, 403, 410, 41, 417, 444–446, 448, 450, 483, 467, 468, 516, 536; 426/510, 511, 520–522, 523, 496, 447, 451, 457, 557, 231, 236; 126/20, 369; 219/401, 400; 422/26, 307

[56] References Cited

U.S. PATENT DOCUMENTS

| | | |
|---|---|---|
| D. 362,101 | 9/1995 | Maddux et al. . |
| 3,744,474 | 7/1973 | Shaw . |
| 3,790,391 | 2/1974 | Bolleter et al. ............. 99/330 |
| 4,011,805 | 3/1977 | Vegh et al. ............. 426/510 X |
| 4,072,762 | 2/1978 | Rhodes ..................... 426/510 |
| 4,173,215 | 11/1979 | Bureau et al. ......... 99/330 X |
| 4,281,636 | 8/1981 | Vegh et al. ............. 99/467 |
| 4,571,341 | 2/1986 | Sugimura ................ 426/510 |
| 4,582,047 | 4/1986 | Williams ................ 126/369 |
| 4,655,192 | 4/1987 | Jovanovic . |
| 4,701,340 | 10/1987 | Bratton et al. ............. 426/511 |
| 4,906,485 | 3/1990 | Kirchhoff ............. 126/20 X |
| 4,924,072 | 5/1990 | Oslin ..................... 219/401 |
| 4,991,545 | 2/1991 | Rabe et al. . |
| 5,184,538 | 2/1993 | Ledet ..................... 99/483 X |
| 5,223,696 | 6/1993 | Violi ..................... 219/401 |
| 5,368,008 | 11/1994 | Oslin . |
| 5,442,997 | 8/1995 | Branz et al. . |
| 5,517,980 | 5/1996 | Cappello et al. ............. 126/20 |
| 5,549,038 | 8/1996 | Kolvites . |

*Primary Examiner*—Timothy F. Simone
*Attorney, Agent, or Firm*—Wood, Herron & Evans, L.L.P.

[57] ABSTRACT

A convective food steamer includes at least one chamber for steaming food and the like in which the steam is dispersed into the chamber through a number of variously oriented and configured nozzles which promote the convective flow of steam within the chamber for more complete and even steaming of the food. Various sets of the nozzles are arranged and configured in combination with baffles in the chamber to generate the convective flow of steam therein. The steam is delivered to the various nozzles through a feed pipe which is in communication with a remotely located steam boiler. The steam boiler may provide steam to a number of remotely located discrete steaming chambers.

21 Claims, 6 Drawing Sheets

CONVECTION FOOD STEAMER AND ASSOCIATED METHOD

BACKGROUND OF THE INVENTION

This invention relates generally to a food steamer and the associated method for steaming food and, more particularly, to a novel convection food steaming apparatus and the method which is particularly suitable for commercial, restaurant and institutional use.

The preparation and processing of foods, including frozen foods, in large quantities for schools, restaurants, hospitals and other institutions presents very distinct problems. With respect to frozen foods, a large component of the preparation time is waiting for the frozen foods to defrost and then subsequently cook. This time and labor can be minimized if the frozen food, along with other food items to be cooked, can go directly from the freezer to the cooker without an intermediate defrosting step. Food preparation of this type would eliminate the need for determining in advance the quantity of food required while still being ably to readily and promptly prepare and serve the food.

Several possibilities for cooking and/or defrosting food are available, including conventional ovens. However, conventional ovens have a low rate of heat transfer and, thus, are too slow for many applications, particularly the preparation of frozen food in very large quantities. Furthermore, conventional ovens often extract moisture and flavor from the food being prepared. Microwave ovens are an alternative to conventional ovens but offer limited capacity, often do not uniformly heat or defrost the food and do not significantly enhance or retain the flavor of the food being prepared.

Another alternative in the art of cooking is a steam oven to heat food items placed within a cooking chamber or compartment of the steamer. The art of steam cooking was developed as an alternative to cooking food in a free or forced convection hot air environment. Surface heat transfer coefficients associated with condensing saturated steam are typically greater than those of circulating hot air. As a result, foods cooked in a steam environment cook more quickly, retain more moisture, maintain nutritional values and are generally more pleasing in appearance and taste than food cooked in other environments.

However, known steam cooking devices and methods are not without problems. For example, the thermal efficiency of conventional steam cookers is relatively low, the flow of steam into the oven is often continuous so regardless of the quantity of food being steamed in the steamer or the various steaming requirements for the food, whether frozen or not, thermal energy of the steam is wasted. Known steam cookers do not take into account the varying demand for steam cooking times and environments for various food products. Kitchens, restaurants and other institutions often have varying demands for the types of food being steamed, but only have a single or limited number of steamers for preparing the food. As such, the food must be continually monitored or transferred into and out of the steamer thereby requiring a significant amount of attention, labor and time by the kitchen personnel for steaming a variety of different foods. Moreover, the steaming is inefficient because each time the steamer is opened the steam environment must be re-generated.

Another problem associated with known food steamers is the localized nature of the steam. Typically, the steam is released into the cooking chamber and, particularly in the case of large steaming chambers, becomes localized or focused in certain areas of the steamer. As a result, certain portions or items of foods in one location in the steamer become overcooked or excessively heated whereas other items require additional time because of the localized absence of cooking steam in that area of the steamer.

Another significant drawback with known food steamers, particularly pressure steamers is the potential injury to kitchen workers during operation of the steamer. In a conventional steamer in which steam is supplied to the oven by a boiler or the like. The oven has an access door which is typically manually sealed and must be manually opened. Prior to removing the steamed food, the pressurized steam must be released thereby adding another step to the cooking process. This rush of steam upon opening the door may cause severe burns particularly on the hands and face of the operator unless extreme care and caution is exercised when opening the food steamer door. High pressure devices are always a danger, particularly with the use of steam. Inattention to precautionary measures, which is particularly likely during extremely busy times, can cause severe injury. Moreover, pressure steamers cannot typically be opened quickly to add food as required and the cooking space of such pressure steamers is typically limited.

Furthermore, food steamers adequately sized for large institutions, restaurants, hospitals, schools or the like require a significant amount of floor space in the kitchen for the food steamer itself, steam boiler and other associated components. In many instances, floor space in food preparation areas, such as kitchens or the like, is at a premium and is often difficult to safely and conveniently accommodate the required components for an adequately sized food steaming system.

SUMMARY OF THE INVENTION

Based upon the foregoing, it is apparent that there is a need for an improved food steaming system and associated method which overcomes the drawbacks and disadvantages of known steam cookers. These drawbacks and disadvantages have been overcome by the present invention which, in a presently preferred embodiment, is a convective food steamer primarily for commercial cooking applications in restaurants, institutions, schools, hospitals and the like. The food steamer can be used for thawing and/or cooking vegetables, shell fish, lasagna, and other foods. The food steamer provides a fast, efficient and economical means for steaming large quantities of foods. Moreover, the food steamer of this invention maintains the flavor, freshness and moisture of the foods being steamed in a safe, efficient and cost effective manner. Importantly, the food is steamed in an even and consistent manner without localized hot spots or cold spots due to the discharge of the steam within the food steaming chamber and the resulting convective flow of steam in the chamber.

In a presently preferred embodiment, the food steamer includes a housing with a back wall, a top wall, a pair of spaced side walls, a bottom wall and a front wall having a door providing access to a steaming chamber defined by the walls. The steam is generated by a steam boiler remotely located, preferably in a basement, utility room or other area outside of the food preparation area or kitchen and the steam generated by the boiler is delivered to the food steaming chamber by a feed pipe. The feed pipe may service multiple discrete food steaming chambers and delivers the steam to those chambers through a number of steam pipes in communication with the steaming chamber.

Preferably, a number of nozzles are mounted on the steam pipes for discharging the steam within each compartment. A first set of nozzles is preferably arranged along the height of the back wall of the steaming chamber and are oriented to discharge the steam in a generally horizontal direction. A second set of nozzles is arranged on the steam pipes proximate one of the side walls and are oriented to discharge the steam in a generally downward direction. A third set of nozzles is arranged proximate the opposite side wall and are oriented to discharge the steam in a generally upward direction. A fourth set of nozzles may be arranged proximate the top wall of the chamber and oriented to discharge the steam in a generally horizontal direction laterally between the spaced side walls. As such, the arrangement and orientation of the nozzles within the steaming chamber produce a convective flow of steam within the chamber to more evenly and quickly steam the food therein. A variety of different nozzle designs can be employed within the scope of this invention specifically for directing and enhancing the convective flow of the steam in the chamber.

Moreover, a plurality of baffles are preferably located at the juncture between the side walls and the top or bottom walls to direct the convective flow of the steam and inhibit turbulent steam flow in these locations. Additionally, a flue and damper are preferably provided in communication with each chamber and the damper is adjustable between open and closed configurations to vent and contain, respectively, the steam within the compartment. An exhaust fan may additionally be provided to enhance the operation of the flue. A valve on the feed pipe selectively permits and inhibits the flow of steam to the individual steaming chambers. A control circuit operatively coupled to the valve, the damper and the door to the steaming chamber automatically inhibits the flow of steam through the valve and opens the damper when the door to the chamber is opened and permits the flow of steam through the valve and closes the damper when the door is closed for steaming operations.

The present invention uses low pressure (i.e., about 5 psi) direct steaming to eliminate the need for high pressure steaming and the associated cost of strengthening the walls, doors, seals, etc. of the steamer. The excess steam in the present steamer is released by seeping out around the closed door to allow a continuous flow of preferably 212 to 220° F. steam to enter the chamber. This direct steaming method is an alternative to pressure steaming. The steam released around the door is necessary and is a comparatively small loss due to the door materials sealing capability against the stainless steel rails. The convection steaming method forces the steam in a counterclockwise direction around the food, preventing less of the steam to rise and escape.

This convection steamer is faster than non-convection steamers because of the speed with which the steam rotates around the food which allows for a higher constant temperature on the food to decrease cooking times.

According to this invention, more efficient steam generation is provided because the water input to the steam boiler is delivered from a hot water heater also remotely located from the steaming chamber but proximate the steam boiler. The food steaming system according to this invention may include a number of chambers, each fed with steam directly from the steam boiler. Each chamber includes a number of wire supports for supporting perforated pans or containers containing the food to be steamed.

Advantageously, additional steaming chambers can be added to the system as increased demand at the restaurant, institution or other facility requires. Moreover, a variety of sizes of steam chambers may be included with such systems and some of the steam chambers may be remotely located, such as at a serving bar or other area outside of the kitchen, all of which are directly supplied with steam from the remotely located steam boiler. This flexibility and adaptability of the various steaming chamber system designs provides a significant advantage over known conventional steam systems. Furthermore, the modularity and ability to add steaming chambers as required allows for the initial system installation and subsequent expansion as demand and resources would indicate.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
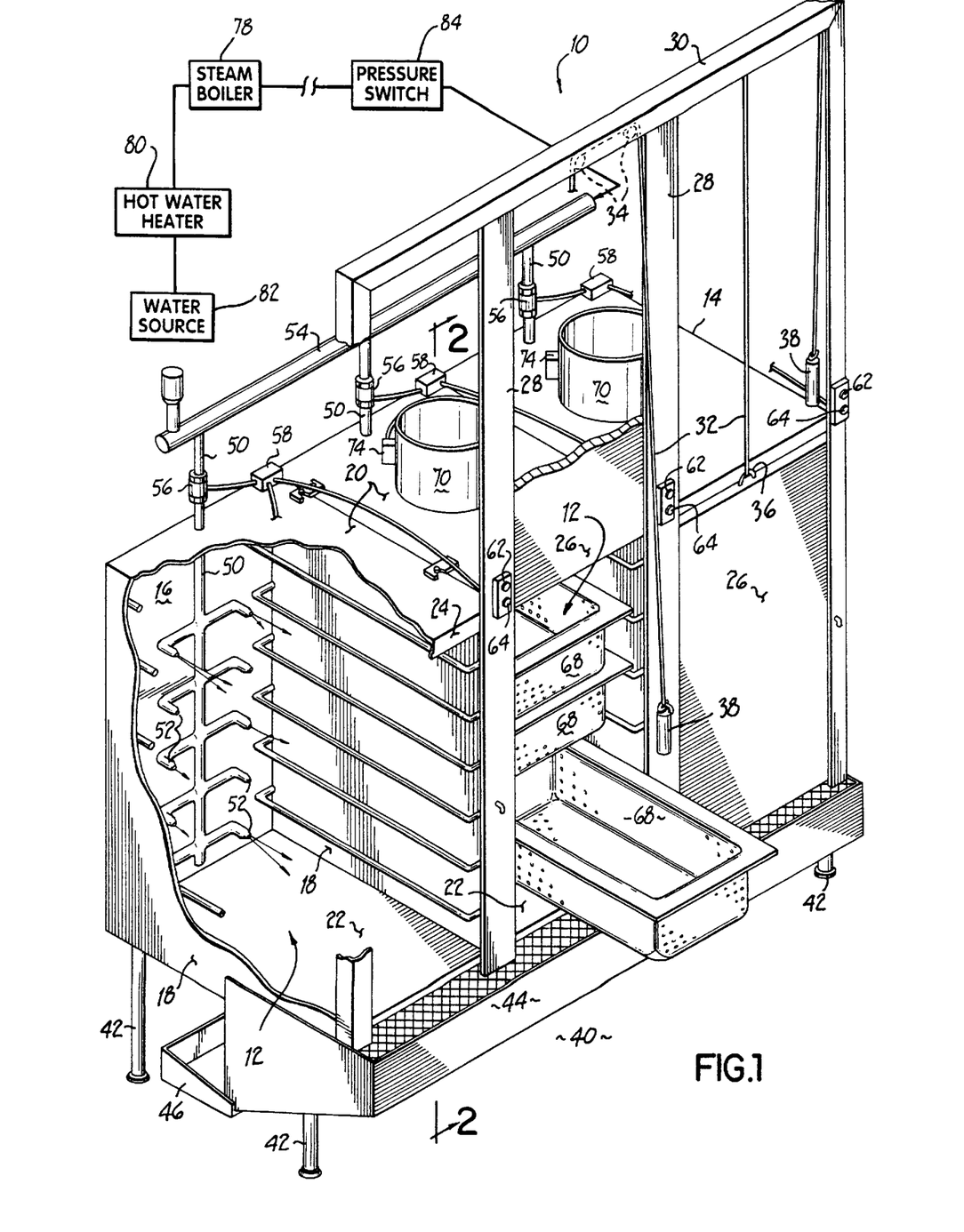
FIG. 1 is a first presently preferred embodiment of a convective food steamer according to this invention having three food steaming chambers which are partially broken away.

Referring to FIG. 1, a first presently preferred embodiment of a system for steaming food is shown which includes multiple discrete food steaming chambers 12, three of which are shown in FIG. 1. Each chamber 12 is enclosed by a housing 14 which includes a back wall 16, a pair of spaced side walls 18, a top wall 20, a bottom wall 22 and a front wall 24 comprising a guillotine-type door 26. The door 26 is mounted for sliding generally vertical movement between a pair of rails 28 mounted within a peripheral frame 30. The housing 14 and walls are preferably stainless steel and the doors 26 are preferably fabricated from injection molded high density polyethylene, another suitable plastic or other non-heat conductive material. The doors 26 are suspended between the rails 28 for generally vertical movement to and between a lower closed position and an upper open position.

A cable 32 is mounted on pulleys 34 on the frame 30 for raising and lowering the door 26. The cable 34 is connected at a first end to ring 36 on an upper edge of the door 26 and at a second end to a wooden or other suitable material handle 38 which can be used by an operator to raise and lower the door 26.

The housing 14 is supported on a kitchen floor 40 by a plurality of downwardly extending legs 42, each of which may be replaced by rollers or other suitable devices for transporting the food steaming system as required. A catch basin 44 extends the longitudinal length of the food steaming system proximate the doors 26 for catching and accumulating any excess moisture, dripage or other falling materials. The catch basin 44 is in communication with a drain pan 46 covering a floor mounted drain 48 as shown particularly in FIG. 2.

A network of steam pipes 50, preferably copper or stainless steel, are mounted within each food steaming chamber 12 to distribute steam within the chamber 12 through a number of nozzles 52 on the steam pipes 50. The steam pipes 50 are operatively coupled to a feed pipe 54 through a solenoid valve 56 or similar device which can open or close to permit or prevent, respectively, the flow of steam from the feed pipe 54 to the steam pipes 50 within the chamber 12. The valve 56 is connected to a relay switch box 58 which is part of a control circuit 60 including an on/off button 62 and a timer 64 mounted on one of the rails 28 which will be more fully described later herein.

A number of spaced wire supports 66 project from the side walls 18 in each steam chamber 12. The wire supports 66 suspend a number of perforate pans 68 or containers into which food to be steamed is placed. Advantageously, the configuration of the various pans 68 and their arrangement within the chamber 12 can be selected by the individual user based upon specific requirements. Preferably, standard two inch or four inch perforate pans 68 of stainless steel construction can be used. The wire supports 66 advantageously avoid the blockage of the convective flow of steam within the chamber 12 and enhance the penetration of the steam into the perforate pans 68 and the food contained therein.

Figure 2:
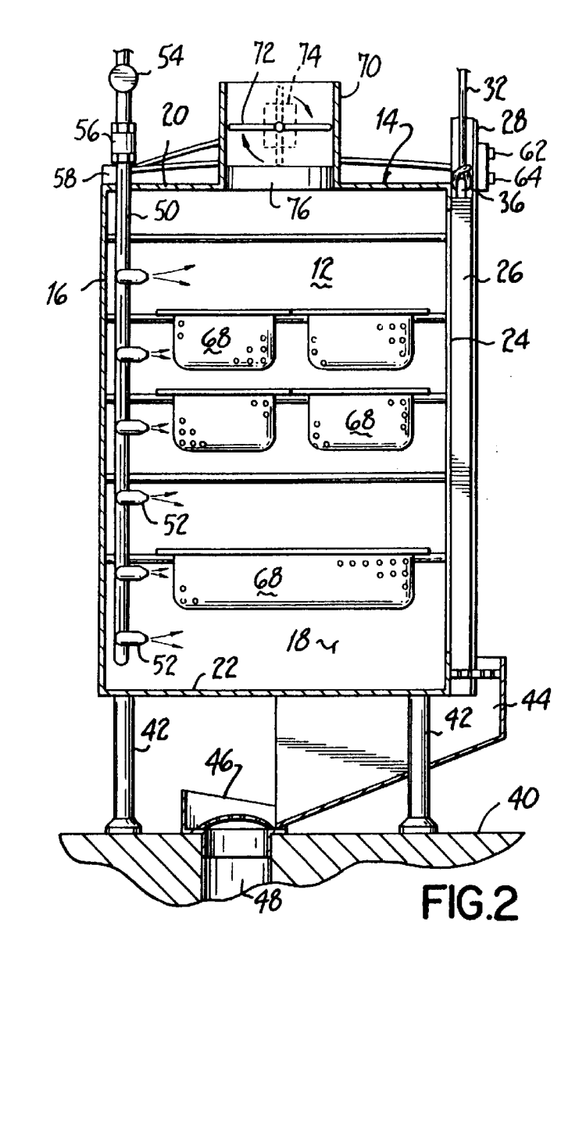
FIG. 2 is a cross-sectional view taken along line 2—2 of FIG. 1.
Figure 3:
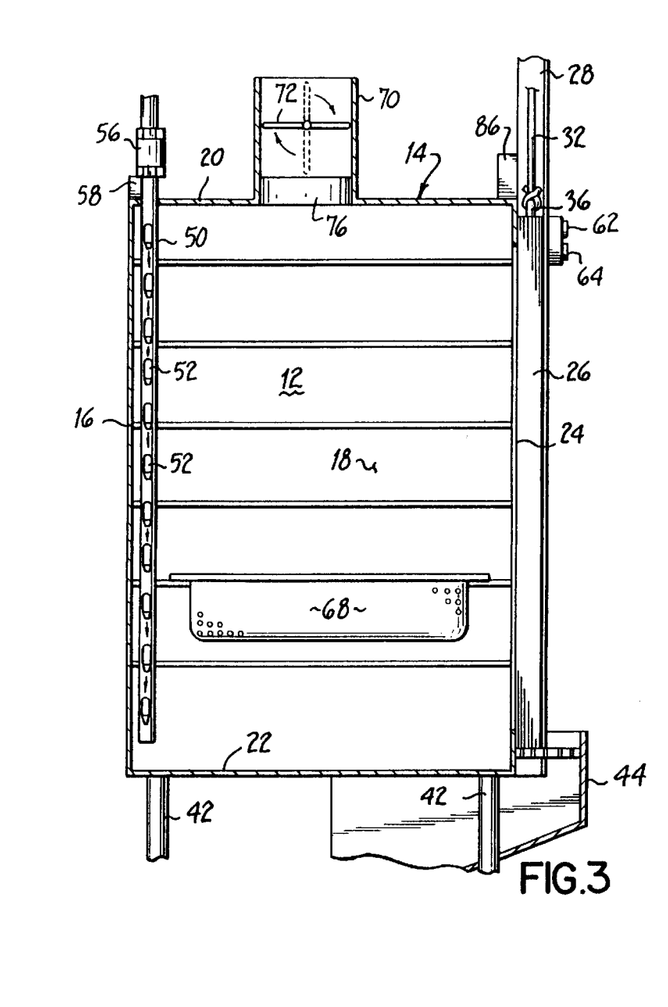
FIG. 3 is a view similar to FIG. 2 of a further alternative arrangement for steam injection nozzles within the food steaming chamber.

A flue pipe 70 is mounted on the top wall 20 of each chamber 12 in communication therewith as shown particularly in FIGS. 1, 2 and 3. A damper 72 is pivotally mounted within the flue pipe 70 for movement to and between an open, generally vertical orientation and a closed, generally horizontal orientation. The damper 72 is pivoted by a motor 74 mounted on the flue pipe 70 which is coupled to the relay switch box 58 and control circuit 60 of each steaming chamber 12. Similarly, an exhaust fan 76 is mounted between the damper 72 and the steaming chamber 12 for evacuating the steam within the chamber 12 upon opening of the door 26 and the damper 72.

Steam is supplied to the steaming chambers 12 via the feed pipe 54 preferably by a remotely located steam boiler 78. The steam boiler 78 receives heated water from a hot water heater 80 which receives water from a standard water supply or other source 82. The steam is preferably delivered to the steam chambers 12 at a temperature between 210° F. and 215° F. for quick, efficient and complete cooking, thawing, defrosting and/or steaming of the food within the chambers 12. Preferably a pressure switch 84 or other regulating device is provided in line on the feed pipe 54 from the steam boiler 78 to the steam pipe 50.

Figure 9:
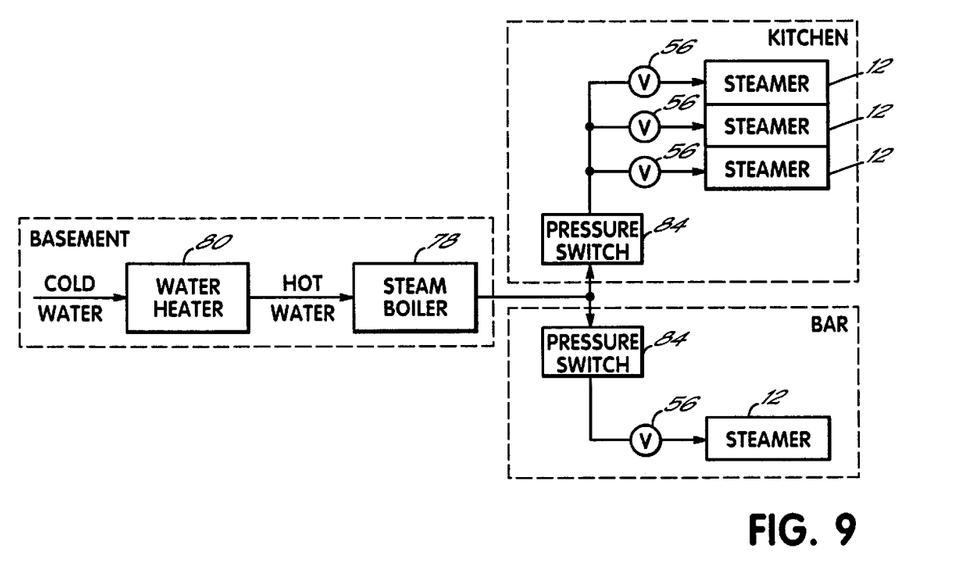
FIG. 9 is a block diagram of a food steaming system according to this invention with a remotely located steam source delivering steam to multiple steaming chambers.

Referring to FIG. 9, the remote location of the steam boiler 78 and water heater 80 is diagrammatically shown relative to the steaming chambers 12. Moreover, multiple steaming chambers 12 are supplied with steam by the steam boiler 78 which may be in a basement, utility room or other area and multiple steaming chambers 12 may be remotely located relative to each other, for example, in a kitchen of an establishment and a separate bar service area as shown in FIG. 9.

Figure 8:
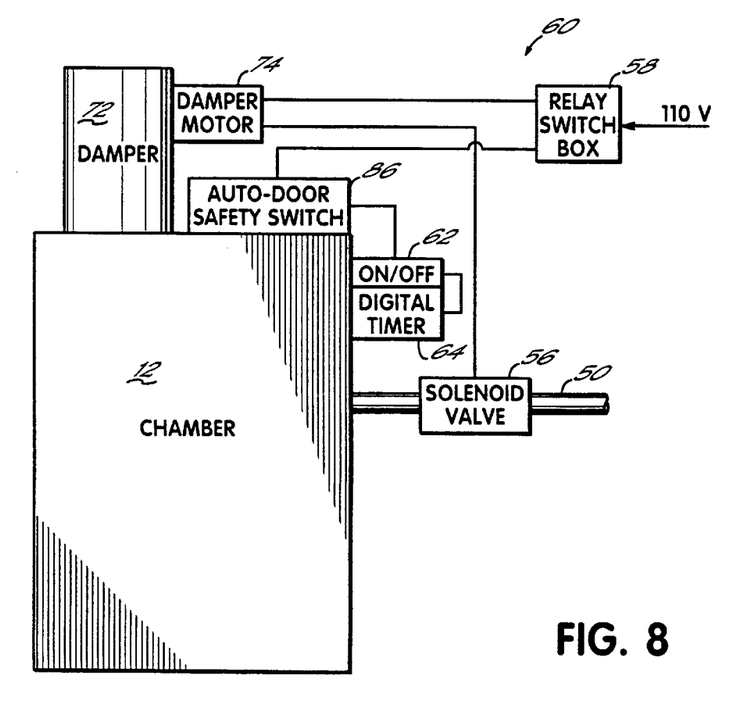
FIG. 8 is a schematic representation of a control circuit for a food steaming chamber according to this invention.

Referring to FIG. 8, the control circuit 60 for the operation of the food steaming chamber 12 according to a presently preferred embodiment of this invention is shown. The relay switch box 58 receives standard 110 voltage electricity for distribution to the damper motor 74 and an automatic door safety switch 86 coupled to the on/off button 62 and digital timer 64 mounted on the front of each steaming chamber 12. Likewise, the damper motor 74 is electrically coupled to the solenoid valve 56 on the steam feed pipe 54 for each chamber 12. As such, upon activation of the steaming chamber 12 via the on/off button 62 or the timer 64, the control circuit 60 closes the damper 72 within the flue 70 and opens the solenoid valve 56 to deliver steam to the chamber 12. Similarly, the auto-door safety switch 86 monitors whether the door 26 is in a closed configuration to prevent the escape of steam from the steaming chamber 12 and possible injury to an operator or the like. Furthermore, the auto-door safety switch 86 is useful if the door 26 is prematurely opened prior to the completion of the cooking cycle. In that event, the damper motor 74 and exhaust fan 76 are engaged to open the damper 72 and exhaust the steam from the chamber 12. Similarly, the solenoid valve 56 is closed to prevent further delivery of steam to the chamber 12 thereby minimizing the likelihood of injury to the operator.

Figure 2A:
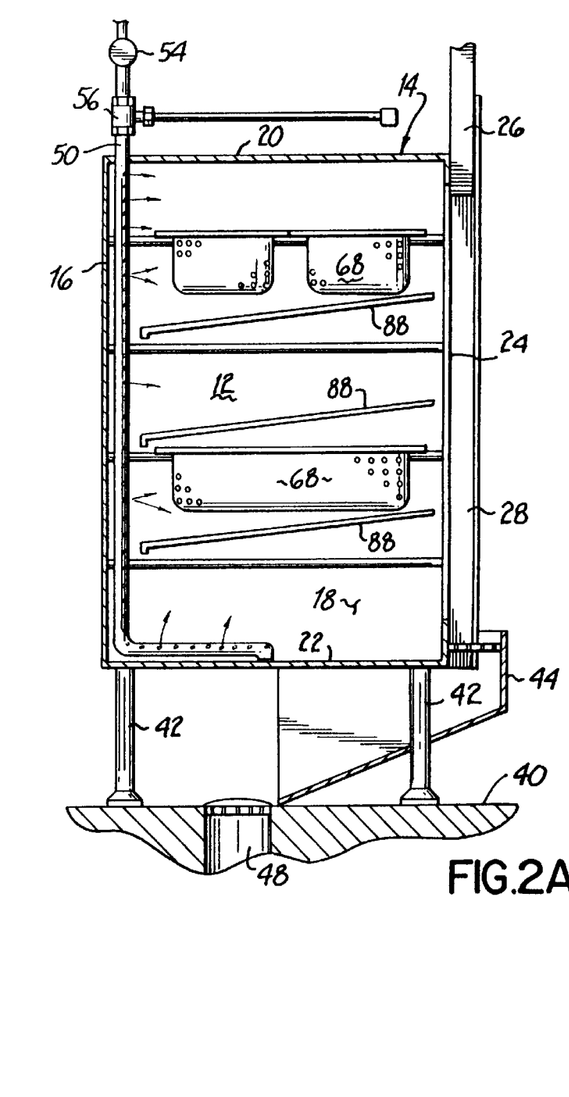
FIG. 2A is a view similar to FIG. 2 of an alternative presently preferred embodiment of a food steaming chamber.

Referring once again to FIGS. 1 and 2, this embodiment of the invention includes a plurality of steam nozzles 52 for discharging steam in a generally horizontal direction. The nozzles 52 are arranged on a network of steam pipes 50 preferably one inch in diameter located proximate the back wall of the chamber 12. Alternatively, the embodiment shown in FIG. 2A includes the steam pipe 50 extending downwardly from the feed pipe 54 proximate the back wall 16 of the chamber 12 and along a portion of the bottom wall 22. The steam is ejected through nozzles 52 in the form of apertures or openings, preferably three-eights in diameter, in the steam pipe 50. Moreover, with respect to the embodiment shown in FIG. 2A, the safety control circuit 60 has been replaced by a manually operated valve 56 to permit and prevent selectively the flow of steam into the chamber. Additionally, a plurality of sloped drip plates 88 are mounted between adjacent pans 68 in the steaming chamber 12 to deflect drippings from pans 68 located above the drip plate 88 from falling into the lower pans 68 thereby avoiding cross-contamination of the flavors of the foods within the respective pans 68. The drippings are diverted towards the back wall 16 of the chamber 12 for drainage or removal therefrom. The embodiment shown in FIG. 3 is similar to that of FIG. 1 with the inclusion of downwardly directed steam nozzles 52 of the type shown in FIG. 5B.

Figure 4:
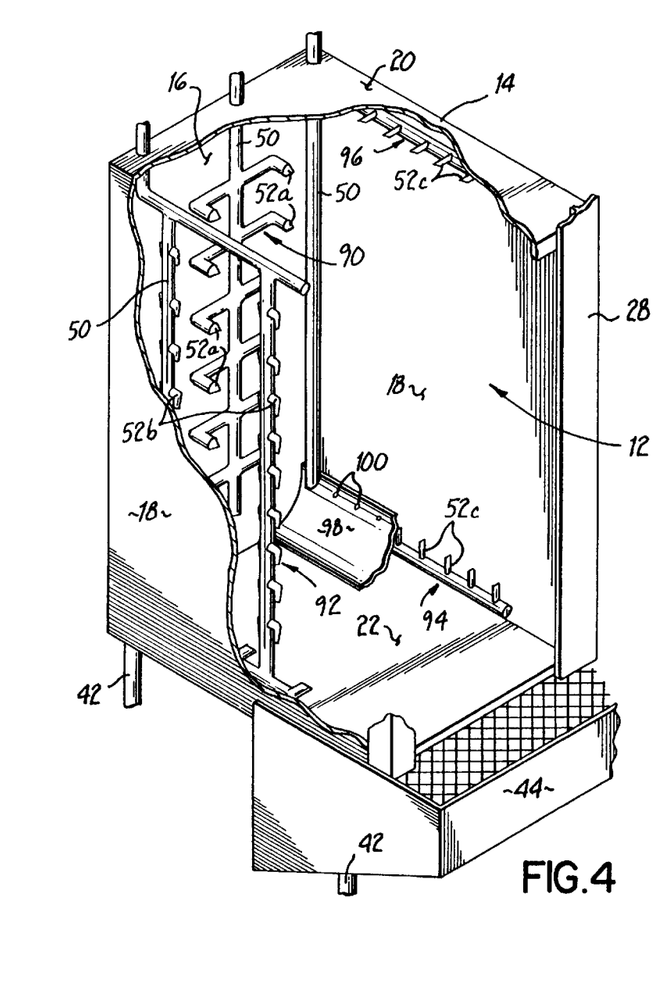
FIG. 4 is a perspective partially broken away view of a further alternative embodiment of a food steaming chamber according to this invention.

Referring to FIG. 4, another presently preferred embodiment of the invention is shown in which a first set 90 of nozzles 52 are mounted proximate the back wall 16 of the chamber 12 for discharging steam generally horizontally within the chamber 12. Additionally, a second set 92 of nozzles 52 are mounted on steam pipes 50 located along one of the side walls 18 of the chamber 12. These nozzles 52b are designed and configured similar to those shown in FIG. 5B for discharging the steam in a generally downward direction. The orientation of the nozzles 52b of FIG. 5B discharge the steam in a direction generally parallel with the axis of the steam pipe 50 to which they are attached.

Advantageously, after the completion of the steaming cycle, any steam or vapor contained within the steam pipe 50 or nozzles 52b which may subsequently condense drains from the nozzles 52b because of the downward orientation. As such, upon subsequent steaming cycles, the initial blow off or discharge of condensed steam is avoided thereby minimizing any contamination problems or build-up with respect to the residual water contained in the nozzles 52b or steam pipes 50.

A third set 94 of nozzles 52c are mounted along the opposite side wall 18 and are oriented and designed to discharge the steam in a generally upward direction. The nozzles 52c in this set are designed and configured according to those shown in FIG. 5C for discharge of the steam generally perpendicularly from the axis of the steam pipe 50.

A fourth set 96 of nozzles 52c are preferably provided proximate the top wall 20 and, more particularly, proximate of a juncture of the top wall 20 and the side wall 18 to discharge steam in a generally horizontal direction laterally between the spaced side walls 18. These nozzles 52c, once again, are of a design and configuration as shown in FIG. 5C.

Figure 7:
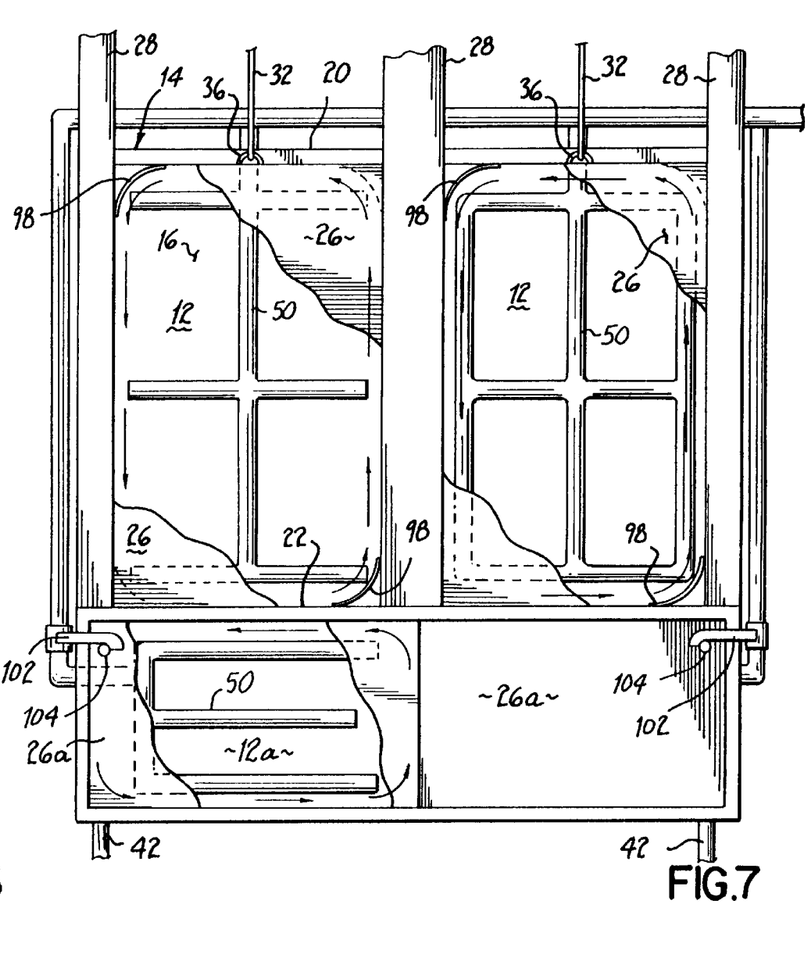
FIG. 7 is a front elevational view partially broken away of a system similar to that of FIG. 6 with alternative steam pipe arrangements to generate the convective flow of steam within the chamber.

Importantly, the arrangement and configuration of the various sets of nozzles 52 within the steaming chamber 12, as shown in FIG. 4, produces a convective movement of the steam within the chamber 12 to thereby more completely and evenly expose and steam the food contained within the pans 68 (not shown in FIG. 4 for clarity purposes) than known conventional steaming systems. Due to the nature of steam, it naturally has a tendency to rise; therefore, the steam nozzles 52 discharge and direct the steam downwardly to promote the convective flow of the steam within the chamber 12. Movement of the steam downwardly along the first side wall 18, across the bottom wall 22, upwardly along the opposite side wall 18 and, once again, laterally across the top wall 20 toward the first side wall 18 generates, promotes and/or enhances the convective steam flow. The convective flow of the steam is enhanced by arcuate-shaped baffles 98 mounted proximate the juncture of the bottom wall 22 or top wall 20 and the adjacent side walls 18 as shown in FIGS. 4 and 7. Preferably, the baffles 98 include holes or openings 100 to provide for the discharge of the steam from the third set 94 of nozzles 52. The first set 90 of nozzles 52 located along the back wall 16 of the chamber 12 further increases the exposure of the food to the steam by directing steam onto the food located within the interior regions of the chamber 12.

Figure 6:
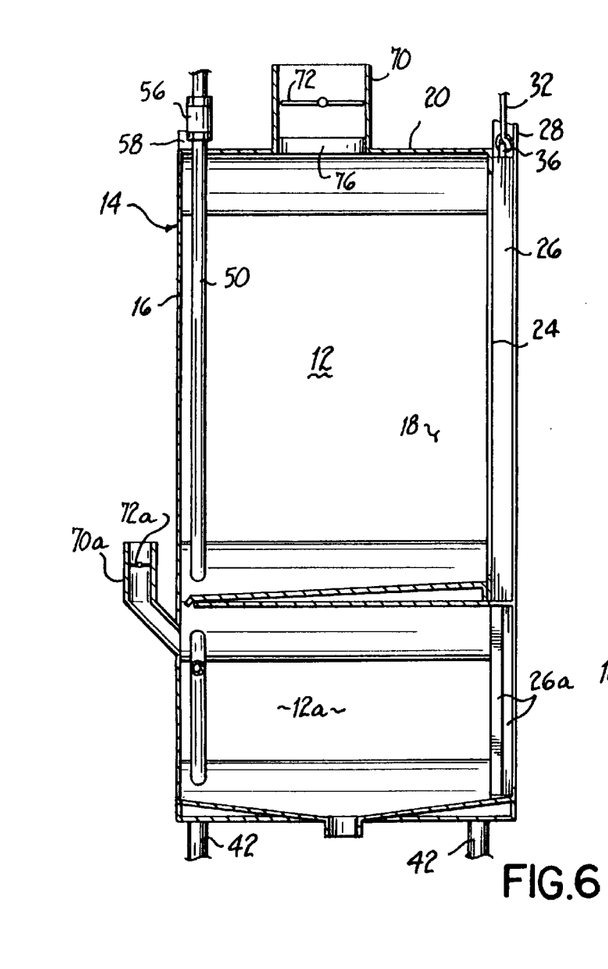
FIG. 6 is a cross-sectional side view of an alternative embodiment of a food steaming system according to this invention showing upper and lower food steaming chambers.

Referring to FIGS. 6 and 7, other alternative presently preferred embodiments of a food steamer system 10 according to this invention are shown. Specifically, the food steamer systems 10 include a number of chambers 12 which are discretely segmented both vertically and horizontally from one another. An upper chamber 12 includes the damper 72 and flue 70 arrangement and guillotine-type door 26 as previously described. However, a lower, smaller steaming chamber 12a includes a horizontally sliding door 26a and a pivotal catch 102 to engage a knob 104 on the door 26a to secure the door 26a in a closed position, as shown in FIG. 7. Each of the chambers 12, 12a are serviced by the feed pipe 54 with steam and can be operated separately from one another. Particularly, the lower chambers 12a include a damper 72a and flue 70a arrangement mounted on a back wall 16a of the housing 14 as shown in FIG. 6. Each of the chambers 12, 12a of the embodiments shown in FIGS. 6 and 7 may include a network of steam pipes 50 for delivering the steam evenly and efficiently within the chamber 12, 12a to promote a convective flow of the steam therein. Moreover, baffles 98, as previously described, can likewise be included in the chambers 12, 12a.

Figure 5A:
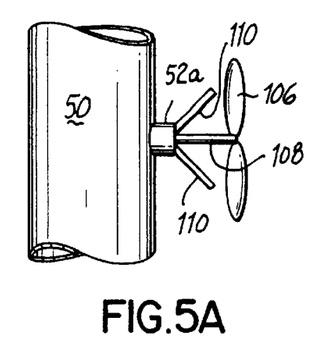
FIGS. 5A–5D are alternative embodiments of steam nozzles, each of which can be used within the steaming chamber of this invention.
Figure 5B:
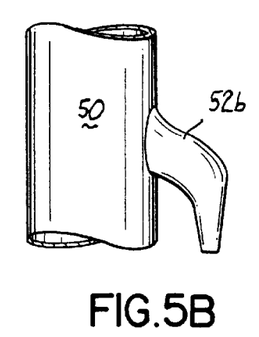
Figure 5C:
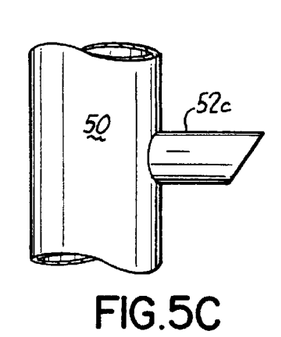
Figure 5D:
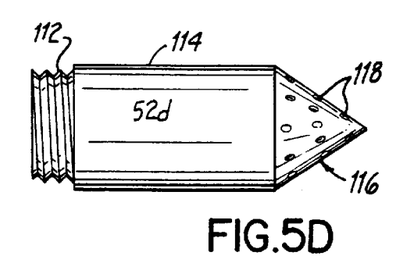

Referring to FIGS. 5A and 5D, alternative embodiments of the nozzles 52a, 52d for discharging the steam from the steam pipes 50 are shown. Specifically, in FIG. 5, a number of fan blades 106 are mounted for rotation on a spindle 108 mounted to a discharge port of the steam pipe 50. Vanes 110 are also included to direct the steam onto the fan blades 106 which will rotate to disburse the steam within the chamber 12 as a result. Alternatively, as shown in FIG. 5D, a removable nozzle 52d may be mounted within a threaded aperture (not shown) on the steam pipe 50. A threaded coupling 112 on the nozzle 52d includes a central bore hole (not shown) through which the steam enters a nozzle body 114 for eventual discharge from the nozzle through a cone-shaped tip 116 which includes an array of discharge apertures 118 for directing and discharging the steam.

From the above disclosure of the general principles of the present invention and the preceding detailed description of at least one preferred embodiment, those skilled in the art will readily comprehend the various modifications to which this invention is susceptible. Therefore, I desire to be limited only by the scope of the following claims and equivalents thereof.

What is claimed is:

1. An apparatus for steaming food comprising:
   a housing having a back wall, a top wall, a pair of spaced side walls, a bottom and a front wall comprising a door all of which in combination enclose at least one food steaming compartment;
   a plurality of steam pipes in communication with the compartment;
   a feed pipe operatively coupled to the steam pipes;
   a steam source operatively coupled to the feed pipe to supply steam for distribution via the steam pipes within the compartment;
   a plurality of nozzles coupled to the steam pipes for discharging the steam within the compartment;
   a first set of the nozzles being arranged proximate one of the walls and oriented to discharge the steam in a generally horizontal direction;
   a second set of the nozzles being arranged proximate one of the side walls and oriented to discharge the steam in a generally downward direction; and
   a third set of the nozzles being arranged proximate the other one of the side walls and oriented to discharge the steam in a generally upward direction;
   whereby the arrangement and orientation of the nozzles produces a convective flow of steam within the compartment to more evenly and quickly steam the food therein.

2. The apparatus of claim 1 further comprising:
   a fourth set of nozzles being arranged proximate the top wall and oriented to discharge the steam in a generally horizontal direction laterally between the spaced side walls.

3. The apparatus of claim 1 further comprising:
   a plurality of perforate pans within the compartment to contain the food; and a plurality of wire supports mounted to the side walls for supporting the pans.

4. The apparatus of claim 3 further comprising:

a drip plate mounted within the compartment between vertically adjacent pans to inhibit drippings from an upper pan from falling onto the food in a lower pan.

5. The apparatus of claim 1 wherein the steam source is remotely located relative to the housing.

6. The apparatus of claim 1 further comprising:

a plurality of the housings each having a separate compartment and first, second and third sets of nozzles, all of the housings being operatively coupled to the feed pipe and receiving steam from the single steam source.

7. The apparatus of claim 1 wherein the door is a guillotine type door mounted for upward and downward movement to open and close, respectively, the compartment.

8. The apparatus of claim 1 further comprising:

a baffle mounted within the compartment proximate an intersection between the other one of the side walls and the bottom wall to direct the steam upwardly.

9. The apparatus of claim 1 further comprising:

a damper in communication with the compartment, the damper being adjustable between open and closed configurations to vent and contain, respectively, the steam within the compartment.

10. The apparatus of claim 9 further comprising:

a valve on the feed pipe to selectively permit and inhibit the flow of steam therethrough; and a control circuit operatively connected to the valve, the damper and the door to automatically inhibit the flow of steam through the valve and open the damper when the door is opened and permit the flow of steam through the valve and close the damper when the door is closed.

11. The apparatus of claim 1 wherein the steam source further comprises a water source operatively coupled to a water heater for producing heated water and a steam boiler operatively coupled to the water heater for producing steam to be delivered to the housing via the feed pipe, the water heater and steam boiler being remotely located relative to the housing.

12. The apparatus of claim 1 wherein the nozzles are oriented and configured to drain condensed steam when the apparatus is not in use to prevent the discharge of condensed steam from the nozzles upon subsequent start-up of the apparatus.

13. An apparatus for steaming food comprising:

a housing having a back wall, a top wall, a pair of spaced side walls, a bottom and a front wall comprising a door all of which in combination enclose at least one food steaming chamber;

a plurality of perforate pans within the chamber to contain the food;

a plurality of wire supports mounted to the side walls for supporting the pans;

a drip plate mounted within the chamber between vertically adjacent pans to inhibit drippings from an upper pan from falling onto the food in a lower pan;

a plurality of steam pipes in communication with the chamber;

a feed pipe operatively coupled to the steam pipes;

a steam source operatively coupled to the feed pipe to supply steam for distribution via the steam pipes within the chamber;

a damper in communication with the chamber, the damper being adjustable between open and closed configurations to vent and contain, respectively, the steam within the chamber;

a plurality of nozzles coupled to the steam pipes for discharging the steam within the chamber;

a first set of the nozzles being arranged proximate the back wall and oriented to discharge the steam in a generally horizontal direction;

a second set of the nozzles being arranged proximate one of the side walls and oriented to discharge the steam in a generally downward direction; and a third set of the nozzles being arranged proximate the other one of the side walls and oriented to discharge the steam in a generally upward direction;

a fourth set of nozzles being arranged proximate the top wall and oriented to discharge the steam in a generally horizontal direction laterally between the spaced side walls;

a plurality of baffles each mounted within the chamber proximate an intersection between the side walls and an adjacent wall to direct the steam;

whereby the arrangement and orientation of the nozzles and baffles produces a convective flow of steam within the chamber to more evenly and quickly steam the food therein.

14. The apparatus of claim 13 further comprising:

a plurality of the housings each having a separate chamber and first, second, third and fourth sets of nozzles and baffles, all of the housings being operatively coupled to the feed pipe and receiving steam from the single steam source.

15. The apparatus of claim 13 further comprising:

a valve on the feed pipe to selectively permit and inhibit the flow of steam therethrough; and a control circuit operatively connected to the valve, the damper and the door to automatically inhibit the flow of steam through the valve and open the damper when the door is opened and permit the flow of steam through the valve and close the damper when the door is closed.

16. A method of steaming food, the method comprising the steps of:

placing the food within a perforate container;

inserting the pan into a chamber defined by a back wall, a pair of spaced side walls, a bottom wall, a top wall and a front wall comprising a door;

suspending the container within the chamber by wire supports mounted to the side walls of the chamber;

injecting steam into the chamber in a generally horizontal direction through a first set of nozzles arranged proximate one of the walls;

injecting steam into the chamber in a generally downward direction through a second set of nozzles arranged proximate one of the side walls; and injecting steam into the chamber in a generally upward direction through a third set of nozzles arranged proximate the other one of the side walls;

whereby the injecting of the steam from the first, second and third sets of nozzles produces a convective flow of steam within the chamber to more evenly and quickly steam the food within the pan.

17. The method of claim 16 further comprising:
injecting steam into the chamber in a generally horizontal direction laterally between the spaced side walls through a fourth set of nozzles.

18. The method of claim 16 further comprising:
deflecting drippings falling from a superjacent container suspended within the chamber from falling into a subjacent container.

19. The method of claim 16 further comprising:
venting steam within the chamber upon opening of the door; and
preventing the injecting of steam into the chamber upon opening of the door.

20. The method of claim 16 further comprising:
generating the steam in a steam boiler at a location remote from the chamber;
introducing pre-heated water to the steam boiler for generating the steam; and
delivering the steam to a plurality of chambers through a feed pipe.

21. The method of claim 16 further comprising:
deflecting the steam within the chamber to promote the convective flow of the steam by placing baffles at the juncture between selected walls of the chamber.

* * * * *